(12) United States Patent
Bihler et al.

(10) Patent No.: US 7,586,402 B2
(45) Date of Patent: Sep. 8, 2009

(54) PROCESS AND DEVICE FOR AVOIDING COLLISION WHILE OPENING VEHICLE DOORS

(75) Inventors: Edgar Bihler, Boeblingen (DE); Ingo Dudeck, Weinstadt (DE); Uwe Franke, Uhingen (DE); Axel Gern, Leutenbach (DE); Reinhard Janssen, Ulm (DE); Carsten Knoeppel, Stuttgart (DE); Frank-Werner Mohn, Weil Im Schoenbuch (DE); Rainer Moebus, Stuttgart (DE); Volker Oltmann, Calw (DE); Uwe Regensburger, Ostfildern (DE); Helmut Schittenhelm, Stuttgart (DE); Reinhold Schoeb, Gaeufelden (DE); Avshalom Suissa, Althengstett (DE); Bernd Woltermann, Fellbach (DE); Zoltan Zomotor, Stuttgart (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 10/586,502

(22) PCT Filed: Mar. 21, 2005

(86) PCT No.: PCT/EP2005/002976

§ 371 (c)(1),
(2), (4) Date: Jul. 17, 2006

(87) PCT Pub. No.: WO2006/042573

PCT Pub. Date: Apr. 27, 2006

(65) Prior Publication Data

US 2007/0188312 A1 Aug. 16, 2007

(30) Foreign Application Priority Data

Oct. 13, 2004 (DE) .................. 10 2004 049 742
Dec. 20, 2004 (DE) .................. 10 2004 062 459

(51) Int. Cl.
*B60Q 1/00* (2006.01)

(52) U.S. Cl. ......................................... 340/435; 49/31
(58) Field of Classification Search ................. 340/435, 340/436, 903; 701/301; 49/28, 31
See application file for complete search history.

(56) References Cited

U.S. PATENT DOCUMENTS

| 4,458,446 A | * | 7/1984 | Mochida et al. ................. 49/28 |
| 2004/0200149 A1 | * | 10/2004 | Dickmann et al. ............. 49/26 |
| 2005/0280284 A1 | * | 12/2005 | McLain et al. ........... 296/146.1 |
| 2005/0280518 A1 | * | 12/2005 | Bartels et al. ............... 340/435 |

FOREIGN PATENT DOCUMENTS

DE 195 37 619 A1 4/1997

(Continued)

*Primary Examiner*—Thomas J Mullen
(74) *Attorney, Agent, or Firm*—Patent Central LLC; Stephan A. Pendorf

(57) ABSTRACT

The opening of vehicle doors often leads to collisions with stationary obstacles that are not visible to the occupants or with moving obstacles that approach the vehicle without being noticed. Thus to avoid collisions when vehicle doors are opened, the aim of the invention is to take any modifications to the environmental situation of the vehicle as a result of a movement of the vehicle and the detected objects into consideration. This allows a collision of the vehicle doors with the objects to be reliably avoided. To achieve this, in a first step the probable trajectory of a vehicle is determined. In an additional step, the objects in the vicinity of the vehicle are detected and probable trajectories of said detected objects are determined. Respective probability ranges are then defined both for the vehicle and the pivoting zone of the vehicle doors and for the detected objects. The probability ranges of the pivoting zones of the vehicle doors are respectively compared with the individual probability ranges of the objects, in order to determine whether they overlap. If an overlap is identified, a response; signal that indicates the risk of a collision is generated.

15 Claims, 4 Drawing Sheets

FOREIGN PATENT DOCUMENTS

| DE | 100 04 161 A1 | 8/2001 |
| DE | 102 29 033 A1 | 1/2004 |
| DE | 102 61 622 A1 | 7/2004 |
| EP | 1 375 267 A2 | 1/2003 |

* cited by examiner

PROCESS AND DEVICE FOR AVOIDING COLLISION WHILE OPENING VEHICLE DOORS

BACKGROUND OF THE INVENTION

1. Field of the Invention

The invention concerns a process and device for avoiding collisions when opening vehicle doors.

2. Description of Related Art

When opening the doors of a vehicle, there is always the danger of collision with stationary obstacles, which are not visible to vehicle occupants, or with moving objects, which approach the vehicle without being observed. To address this problem, environment sensor systems and driver safety systems are increasingly employed. These systems include distance warning, parking aids and backing up aids and total angle detection systems as well as separation sensors for indicating the distance of objects in the environment of the vehicle. The sensing of the environment of the vehicle occurs using ultra-sound sensors, near- and long-range radar, lidar, or cameras with other adaptive optic sensors. A combination of multiple sensors may also be employed.

DE 102 61 622 A1 describes a process and a device for door collision warning in a motor vehicle. Objects are detected in the lateral rear area of the vehicle, the distance and speed of the objects is determined, and based on the object speed and the distance to the vehicle, a warning distance is calculated. As soon as the object distance becomes smaller than the warning distance which is a function of the object's speed, a warning signal is generated. In the case of rapidly moving objects, the warning signal is initiated at greater distances than in the case of slowly approaching objects. A change in the speed or direction of the object is however not calculated.

DE 100 04 161 A1 discloses a door safety system, in which the opening of the vehicle door is blocked or released depending upon the vehicle environment situation as detected by sensors. If a stationary object is in the pivot area of the vehicle door, an acoustic warning is emitted. If the monitoring devices associated with the door safety system detect that a moving object is approaching, a warning is emitted in the case that the object is in an area, in which the pivot area of the door defines at the same time a certain safety area. Accordingly, a stationary area of the vehicle is monitored.

A process and a device for recognition of danger is known from DE 10229033. Environment sensors detect objects in the detection area about the vehicle and produce therefrom spacing signals, from which, during movement of the vehicle distance to detected objects is determined. In the case of a stationary vehicle, it is determined from these spacing signals, whether a danger of collision exists between an opened door and an object. For this, both the position of the object as well as the speed are determined and from this the trajectory of the object is ascertained. If the trajectory falls within a minimum separation to the pivot area of the vehicle door, a warning signal is emitted. The minimum distance to the pivot area of the vehicle door is a static value. It must be larger than 0 in order to obtain a safety area.

The known processes have in common, that the position and movement changes of the vehicle as well as the objects are not sufficiently taken into consideration.

It is thus the task of the present invention, to provide a process and a device for avoidance of collisions during opening of vehicle doors, which take into consideration changes of the environment situation of the vehicle on the basis of movement of the vehicle and the detected objects and reliably allow avoidance of collision of vehicle doors with these objects.

The task is solved in accordance with the invention by a process according to the first patent claim and by a device for avoiding collisions during opening of vehicle doors as herein described. Preferred embodiments of the invention are the subject to the dependent claims.

SUMMARY OF THE INVENTION

According to the inventive process a foreseeable track of movement of a vehicle is determined. In a further step the objects in the environment of the vehicle are detected and a projected movement trajectory of each of the detected objects is determined. The probability space of the pivot area of the vehicle doors are respectively compared with the individual probability spaces of the objects, in order to determine whether an overlapping exists. If an overlapping is detected, then a reaction signal indicating a danger of collision is produced.

The track of movement of the vehicle is determined from the sensor data collected by the vehicle, which are data, are provided by vehicle sensors. The vehicle sensors detect vehicle data such as, for example, wheel RPM signals, speed signals, steering wheel angle, vehicle position, yaw angle, yaw rate, and longitudinal or transverse acceleration. Beyond this, resort can also be made to digital sources such as for example, digital maps and GPS information, so that the vehicle position can also include other information such as for example, traffic lights, cross walks, bicycle paths or streetcar tracks. The data from individual sensors can be combined with each other without restriction in order to determine as precisely as possible the movement path of the vehicle.

The information for recognition of objects in the environment of the vehicle is obtained from environment sensors, which often are already in place in vehicles. Advantageously, sensor data is employed which is produced by near-range radar, long-range radar, ultra-sound sensors, lidar sensors or cameras. The individual sensor data can be freely combined with each other in order to recognize objects in the near or distant environment of the vehicle. From the sensor data it is possible to detect, besides the position, also the direction of movement, acceleration and speed of the objects. Beyond this, information regarding the track of the road and the road edges are available. From these data, the projected movement path for the detected objects is determined.

Preferably, the movement paths are obtained from the past data and the present sensor data and extrapolated into a predetermined future time $t_x$. The extrapolation time $t_x$ can be predetermined or could be varied depending upon on employed environment sensor or the vehicle speed.

In accordance with the invention, a danger of collision can be determined, when the probability space of the sensor areas of the vehicle doors overlaps with the probability space of the detected objects. The probability space is respectively the expected projected occupation space for the vehicle or, as the case may be, the pivot areas of the vehicle doors and for the objects at a certain point of time $t_1$. The extrapolation of the movement path is carried out between the point in time $t_0$, which represents the present position of the object or, as the case may be, vehicle, and up to a certain extrapolation point $t_x$. Thereby a very precise prediction of a possible collision danger between a moving vehicle and a moving object is made possible.

If, for example, the curved track of approaching objects crosses the movement path of the moving vehicle, then a danger of collision exists, but only when the intersection of the paths exists at the same time. The same applies with respect to the possible occupation spaces or, as the case may be, the time dependent probability space. No collision danger exists if an approaching object at the present point in time intersects only a future lying extrapolation point $t_x$ probability of space occupancy of the doors.

For locationally fixed resting objects or for a resting vehicle, the probability space, that is, the possible occupation space, is the same as the instantaneous position or as the case may be the actual occupation space. For the doors of a resting vehicle, the pivot area of the doors themselves is set as the probability space.

For determining a collision danger, the already predicted possible occupation spaces of an object or as the case may be the vehicle, and the pivot areas of its doors, are taken into consideration. In a moving vehicle, advanced warning can be made of objects, which will possibly soon enter into the pivot area of the doors. In the case of resting objects, the driver of a moving vehicle can be warned of a danger of collision, even before a vehicle reaches a position in which the object extends into the operating space, or as the case may be, the pivot area of the vehicle doors. This has the advantage, that the object at the point in time of a possible collision need not be directly detected by the environmental sensors. It is thus not necessary to detect the space adjacent to the vehicle. Thus, sensors already present in the vehicle, such as, for example, proximity sensors of the parking aid in the bumpers, can be employed. These sensors can be incorporated centrally and in the corners of the bumpers, directed forwards or as the case may be directed rearwards.

In a preferred environment of the invention, a danger of collision exists when the overlapping of the probability space is maintained for a certain period of time. Thereby the error tolerance of the process can be influenced.

Preferably, the probability spaces for the vehicle and for the objects are formed from their predicted movement paths and their probable boundary curves. Since the actual track of the vehicle and the detected objects can deviate from the predicted movement path with increasing prediction time, a space is defined about the movement path, which is determined by two boundary lines. The boundary lines exhibit a spacing oriented orthogonal to the extrapolated path, which is computed from the distance or as the case may be the extrapolation time, by multiplication with a certain object-dependent factor.

For determining the probability space for the vehicle, for the pivot areas of the doors and for the objects, the boundary lines are transformed to the respective outer corner edges of the vehicle, the pivot area of the doors, or the objects. Thereby respectively the right boundary line is transmitted to the right corner of the vehicle and the left boundary curve to the left corner. The width for each possible point in time, a possible position of the object and the vehicle, or as the case may be the pivot area of the doors, is indicated. In this manner, a probable total occupation space can also be determined, which extends over the entire extrapolation time.

Preferably, the warning is emitted prior to a possible collision, if the vehicle is stopped or moves with a slow vehicle speed below a threshold value and when at the same time the object in interest within a certain period of time enters into the possible pivot area of the vehicle doors, that is, in the probability space of the doors. Therewith a warning can be reliably made regarding approaching objects. If these objects are however still far enough away from the possible or actual stopping position of the vehicle, no warning signal must be produced, since direct danger of a collision does not exist.

The reaction signal can trigger an acoustic or optical warning, when the opening of a door is initiated or when the door is opened. An opened door is recognized for example by the contact switch which also turns on and off the vehicle interior or dome lights. The initiation of the door opening can be indicated by the same sensor which is already employed today for the function "keyless go" in the outer door handle. Beyond this, a preferred door opening can also be detected by capacitance sensors in the door handle or by sensors which detect the actuation of the door handle.

The reaction signal can be emitted as an acoustic signal in a loud speaker in the vicinity of the door in interest, which produces a selective localized warning. The warning can also occur over the loud speaker of the radio. One possible optical warning is indicated by warning lights, which can be located for example in the dashboard. A haptic warning can occur via a vibration producer in the door or in the vicinity thereof, for example a vibration producer, which allows the door handle to be vibrated, similar to the vibration alarm of a cell phone.

Particularly preferred is when the reaction signal can control the door lock, such that the corresponding door, for which a collision danger has been recognized, is locked at least for a certain period of time. An opening of the door is then possible following a certain time delay. The corresponding door could however also remain locked as long as the danger of collision exists. An opening of the door from the outside can likewise either be blocked by the reaction signal or could be generally unimpeded.

Further preferred is limiting the opening angle of the relevant door. The door can then only be pivoted to the extent that a collision with an object in the pivot range of the door is precluded. For limiting the opening angle, mechanisms and processes known in the state of the art can be employed.

The inventive process is preferably only carried out, when the vehicle speed is below a certain value, or when it is recognized that a door is to be opened. A continuous sensing of the environment of the vehicle, and the determination and the extrapolation of movement paths, is not necessary.

Beyond this it is advantageous, when the process can be switched off manually by the driver. Further, the inventive process should not be carried out in the case that the vehicle is locked from the outside or when it is recognized, that no person is inside the vehicle. In the case that the speed exceeds a predetermined speed, the process is likewise not carried out.

If a danger of collision no longer exists, that is, no obstacle is in the possible pivot area of the door, the output of the reaction signal ends. This would be the case, when a moving object no longer represents a potential danger at a point in time within the extrapolation time, or when the vehicle moves out of the area of danger of a stationary or a mobile object.

In accordance with the invention, the present task is solved by a device for avoiding collisions when opening vehicle doors with a collision monitoring unit. The collision monitoring unit includes an evaluation unit, which recognizes objects in the environment of the vehicle from sensor data of the environment sensors, and determines movement paths for the detected objects. The evaluation unit determines the movement path of the own vehicle from sensor data provided by vehicle sensors. The collision monitoring system further includes a micro-processor which is adapted to compute a probability space for the vehicle and for the detected objects from the respective movement paths, and to recognize an overlapping of the probability spaces. The micro-processor provides a reaction signal to indicate a danger of collision to the warning means when an overlapping has been determined.

The inventive device receives input from sensors present in the vehicle such as environment sensors and vehicle sensors. As warning means, loud speaker or warning lights could be considered, which likewise could pre-exist in the vehicle. The evaluation unit as well as the micro-processor are, as a rule, connected via a bus system with the environment sensors, that is, the ultra-sound sensors, radar sensors or infra-red sensors or cameras. Further, the sensors of the vehicle sensors are connected to the bus. Beyond this, further sensors can also be connected, for example, sensors that recognize the opening of a door. The micro-processor can also provide a further signal to the door locking unit, in order for example to prevent an opening of the door for at least a pre-determined period of time. Also, by the provision of a suitable signal, the angle of opening of the door can be limited.

Preferably, the collision monitoring system is designed to use the sensor data of the past and to extrapolate the determined movement path for a certain period of time into the future. This can also be carried out by the evaluation unit or by a micro-processor.

In a preferred embodiment of the inventive device, the collision monitoring unit is activated as soon as the vehicle falls below a pre-determined speed or as soon as the opening of a door is recognized. This can also be recognized by suitable sensors or by the door contacts.

Preferably, the collision monitoring device is switched off as soon as the vehicle exceeds a pre-determnined speed. Alternatively, the collision monitoring unit can be switched off manually. The collision monitoring system can also be deactivated as soon as the vehicle is locked from outside.

BRIEF DESCRIPTION OF THE DRAWINGS

A preferred embodiment is explained in greater detail on the basis of the following figures. There is shown in.

DETAILED DESCRIPTION OF THE INVENTION

Figure 1:
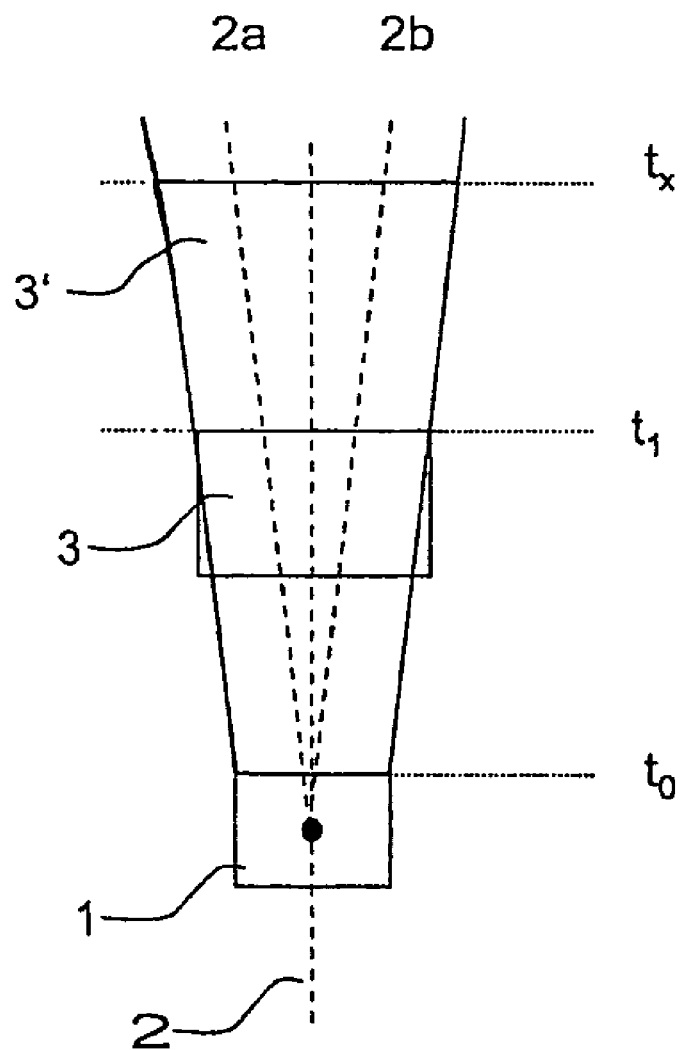
FIG. 1 a schematic representation of an object and a probability space, determined from its movement path.

In FIG. 1 an object 1 is shown at time $t_0$, which is moving in a straight line. From the movement of the object 1 a movement path 2 is determined and extrapolated to a pre-determined time $t_x$. Since the course of the movement path 2 is not certain between $t_0$ and $t_x$, two movement probability curves 2a, 2b are formed with an angle, which brackets the movement path 2. The orthogonal distance of the movement curves 2a, 2b from the movement path 2 at time $t_x$, is produced from a constant factor multiplied by the time $t_x$. Therewith, the boundary curves 2a, 2b and the orthogonal distance at time $t_x$ describe an isosceles triangle, of which the height is formed by the movement path 2.

The boundary curves 2a, 2b are then projected upon the end point of the object 1. In this manner, a total probability space 3' between time to and $t_0$ is spanned. The total probability space 3' reflects for all points in time in the interval $t_0$ through $t_x$ the possibility and expected position of the object 1. Therewith possible occupation locations of the moving object 1 in the relevant time interval can be predicted. At a particular point in time $t_1$ there is produced therewith the probability space 3 for the object 1.

Figure 2:
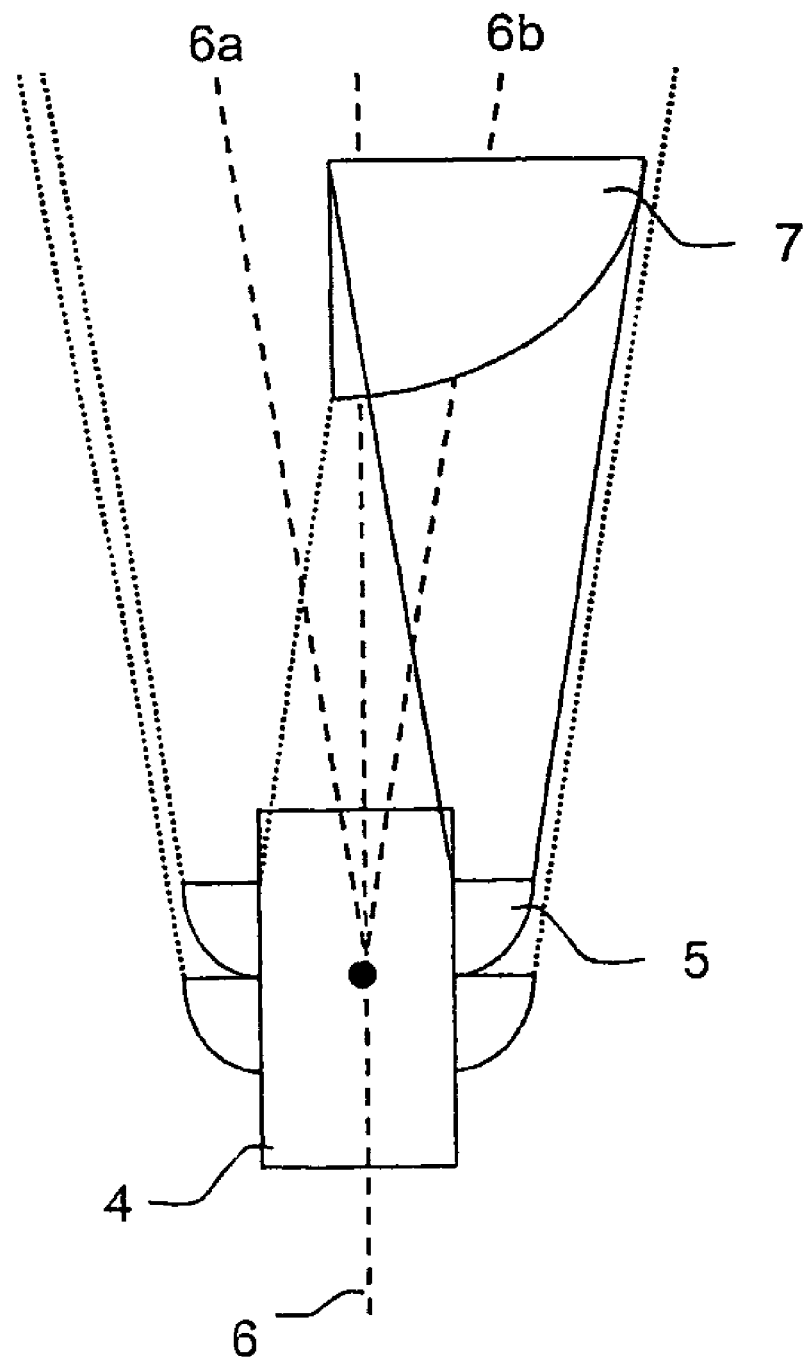
FIG. 2 a schematic representation of a vehicle and the probability space of the vehicle doors.

FIG. 2 shows a schematic representation of a vehicle 4 with four doors. Each of the doors exhibits a pivot area 5, which is shown for illustrative purposes only for the front right door. For the moving vehicle 4 the movement in the past up to time $t_0$ can be used to extrapolate a movement path 6. According to the manner of proceeding in FIG. 1, the boundary curves 6a, 6b of the movement path 6 can be determined. The projection of the boundary curves 6a, 6b onto the pivot area 5 of the front right door leads to the determination of a probability space 7. This represents the possible and expected pivot area of the right door at a future time $t_i$. If for $t_i$ an object is determined in the probability space 7 by the environment sensors of the vehicle 4, then a possible collision danger is recognized and in accordance with the inventive process a warning is emitted.

Figure 3:
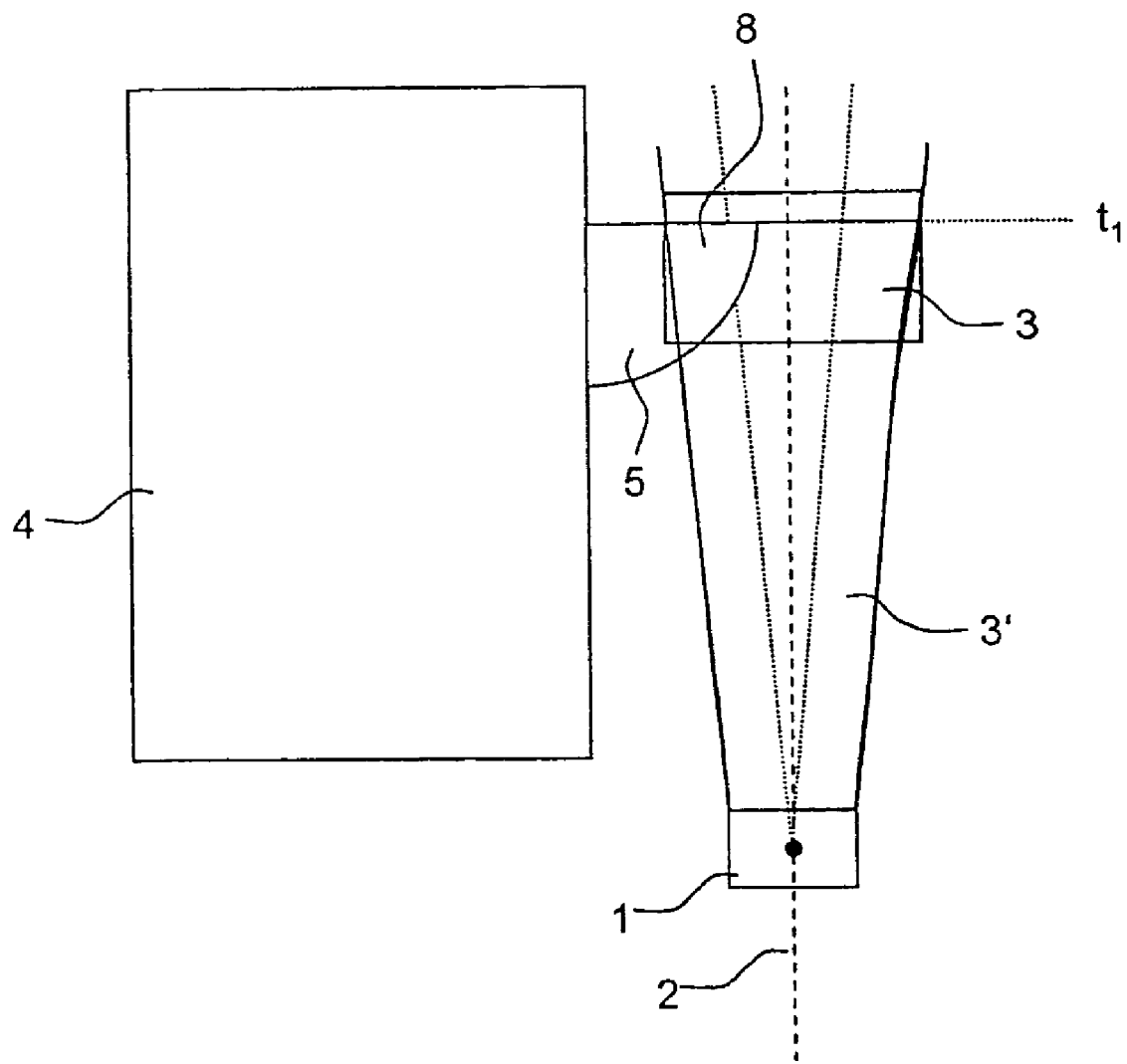
FIG. 3 a schematic representation of a vehicle and a moving object as well as a possible collision space.

FIG. 3 shows a situation with a resting vehicle 4 and an opened right front door, which is characterized by pivot space 5. The object 1 is moving towards the vehicle. From the extrapolated movement path 2 the total probability space 3' of the object 1 is determined, which represents the sum of all possible occupation spaces of the object 1 in the interval $t_0$ through $t_x$. The probability space 3 of the object 1 at a certain point in time $t_1$, overlaps partially with the pivot area 5 of the right side door of the vehicle 4. This overlapping area represents a possible collision area 8, from which in advance a danger of collision is recognized. A direct detection of the pivot space 5 by sensors is thus not necessary. Already from the determination of the probability space 3 and the collision area 8, a possible collision can be extrapolated. According to the inventive process, following the recognition of the collision area 8, a reaction signal is emitted, which could be an acoustic warning signal. Alternatively, the opening of the door of the vehicle 4 can be prevented or the pivot range 5 of the door can be so limited, so that the door cannot be pivoted out into the collision area 8.

Figure 4:
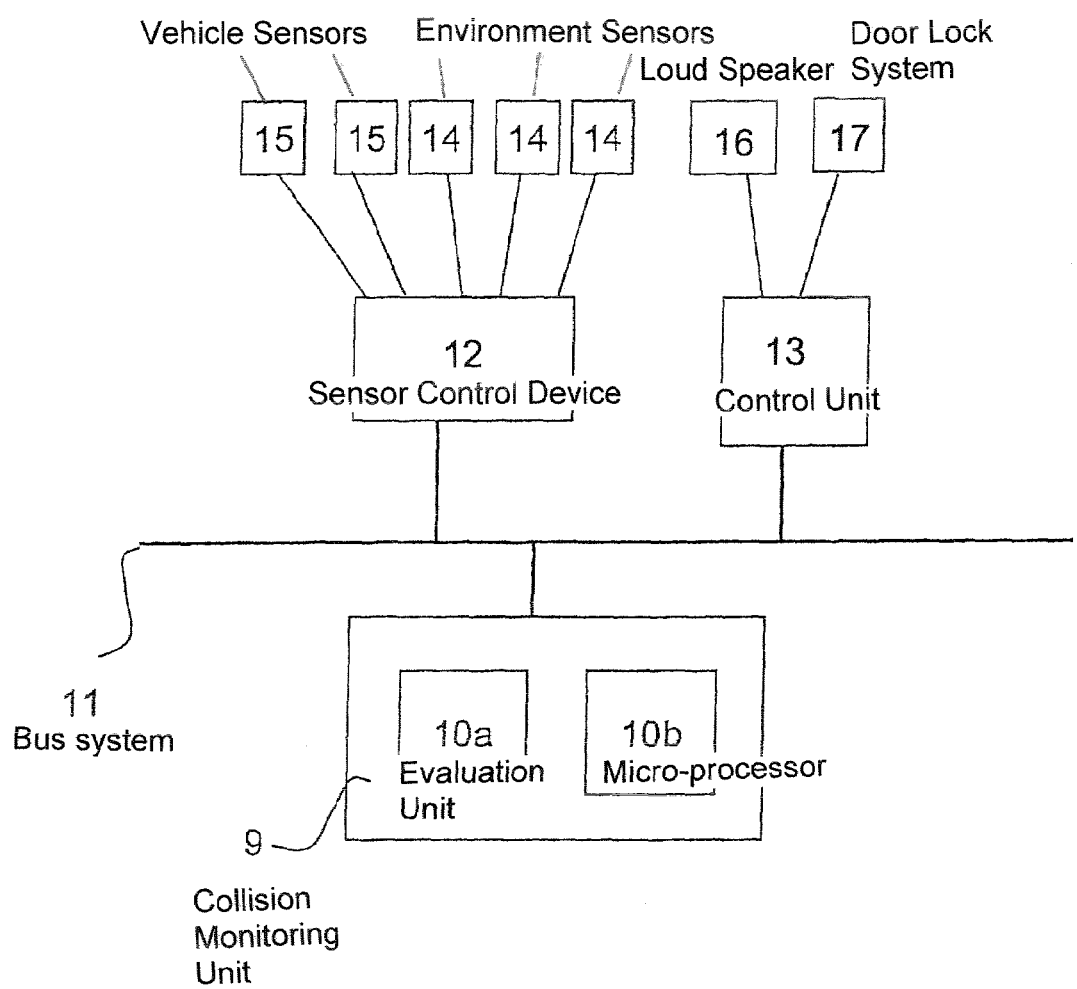
FIG. 4 a block diagram of the inventive device for collision avoidance.

A collision monitoring unit 9 according to FIG. 4 includes an evaluation unit 10a and a micro-processor 10b. The collision monitoring unit 9 is connected via a bus system 11 with a sensor control device 12 and a control unit 13. Environment sensors 14 and,vehicle sensors 15 are directly connected with the sensor control device 12. The sensor control device 12 receives the sensor data and conveys this to the evaluation unit 10a. In the evaluation unit 10a the sensor data are used for determining the movement path for the vehicle as well as the objects recognized via the environment sensors 14. The micro-processor 10b extrapolates the movement path up to a pre-determined time and determines the probability space for the vehicle as well as for the detected objects. If a collision danger is recognized, the micro-processor 10b provides via the bus system 11 a reaction signal to the control unit 13. This selectively produces an acoustic signal, which is emitted via a loud speaker 16. The control unit 13 is also connected to a door lock system 17. If a reaction signal from the micro-processor 10b is present, then the control unit 13 selectively also relays a signal to the door lock system 17, so that the unlocking of the door is blocked at least for a pre-determined period of time. In an advantageous manner, the collision monitoring unit is in communication with a bus system, via which data regarding position, size and/or number of doors is provided. The bus system could be for example a CAN bus system.

A particularly advantageous embodiment includes a warning device for traffic participants in the environment of the vehicle. Thereby it is envisioned, that the other traffic participants are alerted to the possible opening of the door by optical (for example, blinkers or headlamp flashers) or acoustic (for example, signal horn) warning signals in the case of an imminent or already underway car door opening, if at the same time the collision monitoring unit has recognized a danger of collision. Therein, it is advantageous if the light and/or the acoustic signals can be attenuated in their intensity depending upon the degree of the danger of collision. If possible, the projection of the signal should be localized depending upon the doors which are being opened.

We claim:

1. A process for avoidance of collision when opening doors of a vehicle, comprising the following steps:
    determining a projected path of movement (6) of the vehicle (4),
    detecting objects (1) in the near or far environment about the vehicle (4) using environment sensors,
    determining the projected movement paths (2) of the detected objects (1),
    determining a probability space (7) for the pivot area (5) of the vehicle doors and a probability space (3) for each detected object (1),
    comparing the probability space (7) of the pivot areas (5) of the vehicle doors with the probability spaces (3) of the objects (1) so that a possible overlapping can be detected, and
    producing a reaction signal indicating a danger of collision when an overlapping is recognized.

2. A process according to claim 1, wherein the movement paths are extrapolated from the past out to a pre-determined future period of time.

3. A process according to claim 1, wherein the reaction signal indicating danger of collision is produced when an overlapping of the probability spaces (3, 7) at a point in time and/or a certain duration of time is indicated.

4. A process according to claim 1, wherein the probability space (7) for the pivot area (5) of the vehicle doors and the probability space (3) for the object (1) are determined by probability boundary curves (2a, 2b, 6a, 6b) of the projected path of movement (2, 6).

5. A process according to claim 1, wherein the reaction signal triggers an acoustic, optic or haptic warning, when the opening of the door is initiated or when the door is opened.

6. A process according to claim 1, wherein the reaction signal so controls the door lock, that the corresponding door is locked for at least a certain amount of time.

7. A process according to claim 1, wherein the process is only carried out in the case that the speed of the vehicle (4) does not exceed a predetermined value and/or the opening of a door is recognized.

8. A process according to claim 1, wherein the process is carried out by a collision monitoring unit, and wherein the process is deactivated by manual switching-off of the collision monitoring unit, or by closing of the vehicle (4) from the outside, or when no person is inside the vehicle (4), or when the vehicle speed exceeds a pre-determined speed.

9. A process according to claim 1, wherein the output of the reaction signal is terminated, as soon as the collision danger no longer exists.

10. A device for avoiding collisions during opening of vehicle doors, including a collision monitoring unit (9) including
    an evaluation unit (10a), which recognizes objects (1) in the environment of a vehicle (4) from sensor data from environment sensors and determines projected movement paths (2) for the detected objects (1) and which determines the projected movement path (6) of the vehicle (4) from sensor data from the sensors, and
    a micro-processor (10b), which is programmed to determine a probability space (7) for the vehicle (4) and probability paths (3) for the detected objects (1) and to recognize an overlapping of a probability space (7) and a probability path (3), whereupon the micro-processor (10b) emits a reaction signal indicating danger of collision to a warning means or a control unit (13) in the case that an overlapping has been determined.

11. A device according to claim 10, wherein the collision monitoring unit (9) is designed to extrapolate from the past sensor data the movement path (2, 6) of
    (a) an object in the environment of the vehicle (4) and
    (b) the vehicle (4) for a pre-determined period of time into the future.

12. A device according to claim 10, wherein the collision monitoring unit (9) is activated when at least one of (a) the speed of the vehicle (4) drops below a pre-determined speed and (b) the opening of a door is recognized.

13. A device according to claim 10, wherein the collision monitoring unit (9) is deactivated when at least one of (a) the vehicle (4) exceeds a pre-determined speed (b) the vehicle (4) is closed from outside and (c) the collision monitoring unit is manually switched off.

14. A device according to claim 10, wherein the collision monitoring unit is connected to a bus system, via which data regarding location, size and/or number of doors is made available.

15. A device according to claim 10, wherein other traffic participants are alerted by optical or acoustic warning signals regarding an imminent or already occurring door opening.

* * * * *